(12) United States Patent
Walser (10) Patent No.: US 7,633,610 B2
(45) Date of Patent: Dec. 15, 2009

(54) METHOD AND DEVICE FOR IMAGE PROCESSING IN A GEODETIC MEASURING INSTRUMENT

(75) Inventor: Bernd Walser, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 60 days.

(21) Appl. No.: 10/548,887

(22) PCT Filed: Mar. 18, 2004

(86) PCT No.: PCT/EP2004/002800

§ 371 (c)(1),
(2), (4) Date: Oct. 5, 2005

(87) PCT Pub. No.: WO2004/083779

PCT Pub. Date: Aug. 30, 2004

(65) Prior Publication Data

US 2006/0192946 A1    Aug. 31, 2006

(30) Foreign Application Priority Data

May 27, 2003 (EP) .................................. 03011908

(51) Int. Cl.
*G01C 1/00* (2006.01)
(52) U.S. Cl. ..................................... 356/141.5; 382/181
(58) Field of Classification Search ............... 356/141.5
See application file for complete search history.

(56) References Cited

U.S. PATENT DOCUMENTS 6,501,796 B1 * 12/2002 Dusseux et al. ........ 375/240.12

(Continued)

FOREIGN PATENT DOCUMENTS

DE    90 07 731.8    12/1994

(Continued)

OTHER PUBLICATIONS

Rüeger, "Electronic Distance Measurement," 4$^{th}$ Edition, Springer-Verlag, Berlin, Heidelberg {1996}.

(Continued)

*Primary Examiner*—Thomas H Tarcza
*Assistant Examiner*—Timothy A Brainard
(74) *Attorney, Agent, or Firm*—Oliff & Berridge, PLC (57) ABSTRACT

The invention relates to a method for the geodesical measurement of an object (1), using a geodesical measuring appliance (2) comprising recording means (3) for acquiring a recorded image (4) at least of the object (1) to be geodesically measured. Once the angular orientation of a coverage strip (5) of the recording means (3) has been determined, the image (4) is captured and represented at least partially in the form of a display image (6). A set of recorded image co-ordinates (7) are determined by establishing at least one set of associated display image co-ordinates (8), and the set of recorded image co-ordinates (7) is transformed into at least one geodesical measuring variable, especially a solid angle. Templates (10) which are in the form of models that can be placed on the display image and at least partially describe the object (1) are used to support the user during the fixing of the target point. Once the template (10) has been selected and positioned, it is adapted to the recorded object (1a) and determines the set of recorded image co-ordinates (7) by means of a characteristic point (11) of the template (10). The invention also relates to an electronic display and control device (31), a geodesical measuring appliance (2), and a computer program product for carrying out the method.

28 Claims, 4 Drawing Sheets

U.S. PATENT DOCUMENTS

2001/0024270 A1* 9/2001 Shirai et al. ............... 356/3.04
2002/0080251 A1* 6/2002 Moriwaki ................... 348/232
2002/0114522 A1* 8/2002 Seeber ....................... 382/218

FOREIGN PATENT DOCUMENTS

| DE | 199 22 321 | A1 | | 11/2000 |
|----|------------|----|---|---------|
| DE | 19922321 | A1 | * | 11/2000 |
| EP | 0 481 278 | A1 | | 4/1992 |
| JP | A 2-130409 | | | 5/1990 |
| JP | A 3-167412 | | | 7/1991 |
| WO | WO 99/60335 | | | 11/1999 |
| WO | WO 2004/036145 | | | 4/2004 |

OTHER PUBLICATIONS

Joeckel et al.,"Elektronische Entfernungs- und Richtungsmessung" [Electronic Distance and Direction Measurement], $4^{th}$ Edition, Verlag Konrad Wittwer, Stuttgart 1999.

* cited by examiner

METHOD AND DEVICE FOR IMAGE PROCESSING IN A GEODETIC MEASURING INSTRUMENT

The invention relates to a method and a device for geodetic surveying of an object with the aid of image processing using a geodetic measuring instrument.

A multiplicity of measuring devices has been known since antiquity for recording properties of defined points in a measuring environment, in particular of data relating to three dimensions. The position of a measuring instrument together with any existing reference points, and direction, distance and angle relative to measuring points, are recorded as standard three-dimensional data. Improvements to date generally related to the use of new technical methods having increased accuracy and rapidity.

However, such devices of the prior art still require the direct orientation of a measuring instrument relative to the point to be surveyed. This is generally effected with the aid of special orientation means, such as, for example, optical telescopes. A generally known example of such measuring instruments is the theodolite. An overview of geodetic measuring devices of the prior art appears in "Elekronische Entfernungsund Richtungsmessung? [Electronic distance and direction measurement] by R. Joeckel and M. Stober, 4th Edition, Verlag Konrad Wittwer, Stuttgart 1999, and "Electronic Distance Measurement" by J. M. Rüeger, 4th Edition, Springer-Verlag, Berlin, Heidelberg 1996.

By combining a geodetic instrument with a screen which is movable or independently mountable relative to this instrument, advantages can be achieved from the point of view of ergonomics and measuring technology. The conventional eyepiece of the telescope is replaced by electronic recording means, so that it is possible to eliminate the previously required link between the operator and the instrument, as well as the requirements or limitations resulting from the use of the human eye. The control of the instrument and of the measurements to be carried out therewith is effected electronically via the display of the screen and a suitable input device for data and control commands. The measurements can then be carried out after orientation is complete, using various methods, such as, for example, by measurement of the angular course with supplementary distance measurement by triangulation or by means of a laser.

The patents JP 02130409 A and JP 03167412 A disclose the combination of a theodolite with a video camera, by means of which rapid and accurate three-dimensional measurements are to be permitted. Here, by means of two theodolite-video camera combinations, recordings of pictures by the respective camera and angle measurements by means of theodolites are made simultaneously. In each case, the axes of video camera and theodolite are parallel so that the angle measurement of a theodolite is linked to the pictures recorded by the camera of this combination. The three-dimensional positions of the imaged objects can be derived from at least two pictures recorded at different angles.

European Patent Application EP 0 481 278 and the associated German Utility Model DE 90 07 731 U disclose a measuring instrument for position determination of opto-electronically displayable points in space. The measuring instrument has a movable measuring head with a camera as a target acquisition instrument and a distance-measuring instrument, the sighting axes of which are aligned precisely with one another. A target point is surveyed by locating it with a camera and then aligning the camera axis with the target point. Precise orientation of the distance-measuring instrument is also associated therewith, so that the axis thereof likewise points at the point to be surveyed.

The European Patent Application with Application No. 01127378 of the same Applicant describes a measuring instrument in which operation in an ergonomically advantageous manner is permitted by separation of recording and display means. By a suitable combination of the display means with the means for inputting data, it is possible to create a separate handling module which can also be used independently of and remote from the measuring instrument and is connected to it by communication means. The use of such a module together with a plurality of measuring instruments as sensor components makes it possible to design remote-controllable geodetic surveying systems. A position mark is displaceable within a displayed measuring area, by means of which position mark parameters of a measuring process can be established and the measuring process can be initiated. The subsequent measuring process aligns the components of the measuring instrument which are required for the measurement with the position determined by the position mark, and the measurement is carried out.

International PCT Application WO 99/60335 discloses a geodetic device which locates a target area by means of a camera and displays said target area on a screen. Within this area, it is possible to select targets and to measure the distance thereof by means of a telemeter by aligning the axis of the telemeter as a complete instrument with the chosen target. Camera and telemeter are moved either together or independently of one another by means of motors.

The European Patent Application with the Application No. 02022820 describes a geodetic measuring instrument in which a movement of the pencil of rays which is required for the measurement within the acquisition area of an optical system is effected without an otherwise necessary movement of the entire optical system or larger components being required for this purpose. This is permitted by the use of optical components of the electronic recording means for emission of the pencil of rays. By means of the radiation emitted via the optical system of the recording means, it is possible in principle to survey all located targets shown in the display, without having to move the optical axis of the recording means or a further independent component of the measuring instrument. The recording means relate to the devices for image production which are used for fixing the target point for a measuring point. The detectors required for carrying out the measurement can also be installed in further measuring instruments, so that fixing and illumination of a target by means of radiation are effected, for example, by a measuring instrument having such an electronic display and control device, but the measurement is carried out by one or more further instruments.

All devices of the prior art which are described require, for each measurement to a point, the surveying of the point by renewed orientation of a measuring device and emission of a signal. Consequently, components of the measuring instrument have to be moved and oriented for each measuring process. Particularly for systems suitable for use in the field, however, the complexity of the measuring instrument and of the measuring process are highly relevant parameters, so that the reduction thereof has immediate advantages. In addition, the frequent movement of parts leads to wear or requires a wear-reducing or hardwearing technical design of the components.

A further disadvantage is the necessity of every instrument having to have its own alignment means in order to align the axis of the measuring instrument or of the measuring radiation with a target. Even if all targets are always within the acquisition area of the recording means for a specific surveying task, point-by-point orientation or sighting and subsequent surveying must be effected for each measuring process.

On the other hand, at least partly automated surveying can be achieved by the special design of target points to be surveyed, for example by use of reflectors as so-called cooperative targets. For this purpose, however, it is necessary to mount the cooperative targets to be measured at the points to be surveyed, which results in particular in high costs. Moreover, the use of cooperative targets is not possible under all circumstances, such as, for example, in the surveying of inaccessible locations. Furthermore, the automated target search and orientation process requires high technical complexity and a considerable time.

One object is therefore to permit semiautomated surveying of noncooperative but structured targets.

A further object is to permit surveying of noncooperative targets within a certain area without mechanical adjustment of a component of the measuring instrument.

A further object is to simplify the design of a geodetic measuring instrument of the generic type.

A further object is to reduce the time and energy required with the use of a geodetic measuring instrument of the generic type.

These objects are achieved by realizing the features of the independent claims. Features which further develop the invention in an alternative or advantageous manner are described in the dependent patent claims.

The achievement makes use of the electronic recording of an acquired observation area. For this purpose, image data which were recorded using a geodetic measuring instrument, for example a theodolite or tacheometer, are used. To enable the image data to be used for surveying the object, the entire measuring instrument-image sensor system must be calibrated. Such a video-measuring instrument system can be used only for surveying arbitrary structured objects. The surveyor is no longer dependent on an active or cooperative target in order to carry out a semiautomated point determination. By integrating the surveyor into the semiautomated measuring process, an ideal link between control by man on the one hand and the reliability of algorithms on the other hand is achieved. Templates in the form of specifications which at least partly describe the object to be surveyed support the surveyor in the choice of those target points of the objects which are to be surveyed. The 3rd dimension of the object is, if required, determined by means of a reflectorless distance measurement.

In this context, the term "geodetic measuring instrument" is always to be understood generally as meaning a measuring instrument which has devices for measuring or checking data relating to three dimensions. In particular, this relates to the measurement of directions or angles and/or distances to a reference or measuring point. In addition, however, further devices, for example components for satellite-supported position determination (for example GPS, GLONASS or GALILEO), may be present, which devices can be used for supplementary measurements or data recordings. In particular, such a geodetic measuring instrument is to be understood here as meaning theodolites, so-called total stations as tacheometer with electronic angle measurement and electronic telemeter, and levels. The invention is equally suitable for use in specialized devices having a similar functionality, for example in military aiming circles or in industrial structure or process surveillance. These systems are thus likewise covered by the term "geodetic measuring instrument".

The geodetic measuring instrument has electronic recording means which acquire objects, especially an object to be surveyed, in the form of recorded image within an acquisition strip. The recording means comprise, for example, a CCD camera, a CMOS camera, a video camera, a low-light-level amplifier or a thermal image camera. The exact angular orientation of the acquisition strip is determined by preferably determining the orientation of the recording means and/or of a lens of the recording means by means of angle encoders of the geodetic measuring instrument. An acquired recorded image or part of this recorded image is visualized in the form of a display image via display means. The display means have in particular an LC display, a cathode ray tube, a flat screen, an interface to communication networks and/or an electronic computer with screen, preferably in the form of a notebook or laptop. At least one display image coordinate is then fixed, for example by positioning a cursor on the display means. The positioning is effected in particular by input means, for example in the form of a keypad, of a joystick, of a trackball, of a computer mouse, of a touch-sensitive input field, of an interface to communication networks and/or via a unit combined with the display means, in particular a touch-sensitive screen or an electronic computer with input device, preferably in the form of a notebook, laptop or hand-held PC, in particular palm-PC. The display image coordinate fixed is coordinated directly or indirectly with a recorded image coordinate, which in turn is transformed into at least one geodetic measuring parameter, in particular a solid angle, preferably a horizontal and a vertical angle. The transformation is carried out taking into account the recorded image coordinate, the angular orientation of the acquisition strip of the recording means, the focus position, the imaging scale, the optical error and/or the temperature-dependent deviations.

Geodetic measuring parameters are to be understood as meaning not only angles and distances but, for example, firstly the coordinates or components of a point in an arbitrary coordinate system, in particular a polar coordinate system and secondly relationships between individual points, in particular distances or angles between object points.

The recorded image coordinate is preferably determined by the surveyor first calling up a template in the form of a specification which at least partly models the object to be geodetically surveyed. The template is positioned approximately on the display image by virtue of the surveyor fixing, for example, at least one display image coordinate by positioning a cursor on the display means. The approximately positioned template is adapted to the recorded object to be geodetically surveyed, in particular by matching. Optionally after selection of a characteristic point of the adapted template, for example of an end point, corner point, point of intersection, midpoint, etc., the recorded image coordinate is determined, whereupon the above-mentioned transformation is subsequently carried out.

Various methods for matching, in particular for template matching, are known from the prior art, for example from model-based, automatic or semiautomatic object recognition and segmentation, in which classification of regions of interest is also possible.

The described method according to the invention is stored, for example, in the form of a computer program product, in particular as software or firmware, and executed by calculation means, in particular a personal computer, a laptop, a notebook, a single-board computer or another electronic computing and control unit.

The data and results of the measuring process can be displayed on the display means. This display is possible in the form of a superposed text or in separate display fields. The latter can be implemented as separate parts of the screen which show, for example, enlarged image segments.

The use of a touch-sensitive flat screen also makes it possible to dispense with special input means, so that the display and input means can be made compact and modular. A further possibility for realizing the display and input means consists in linkage to devices which can also be used for other applications. For example, it is possible to access further additional functionalities via an interface for communication networks or the use of a standard computer, in particular of a portable laptop or notebook. By using computers, additional, optionally universally applicable software can be used. In addition, recorded measured data can be immediately stored in the available memories and, after separation of the geodetic measuring instrument, can also be used in other applications. These advantages can be combined with an Internet link, by means of which additional data transmission or remote control is possible.

The separation of a telescope of the geodetic measuring instrument, which telescope is provided to date with a direct view, into recording and display means also enables the user, independently of the orientation of recording means, to adopt a convenient, ergonomically favorable position. Furthermore, a measuring instrument can be positioned in areas which it has not been possible to use to date, for example in corners or narrow passages.

If the display and input means are designed to be modular, they can be separated structurally from the actual geodetic measuring instrument. A connection to the geodetic measuring instrument, which now substantially comprises only a housing and the components of the lens with sensor elements together with the associated control components, can be established via communication means, for example wire or radio connections. In this context, wire connections are always to be understood below as meaning all flexible communication connections which serve for the transmission of data, but in particular fiber optic and copper cables.

This separation also permits the control of a multiplicity of geodetic measuring instruments as pure sensor units by means of a central control and evaluation unit. The latter can be protected from the weather, for example housed in a vehicle. In addition to the advantages for device and operator, the housing in a vehicle also permits the use of further auxiliary components which, if mounted on the individual measuring instrument, would prohibitively increase the weight thereof. The use of a plurality of sensor units permit simplified, simultaneous measurement to common or different points, orientation of the geodetic measuring instruments relative to one another or overlapping use, in which only a part of the sensor units is used at a time for measurements while the other part is transferred to other locations. The measuring areas of simultaneously used sensor units can be displayed in succession on the same screen or simultaneously on one screen in separate display areas, for example using window or split-screen technology.

A method according to the invention, an electronic display and control device according to the invention, a geodetic measuring instrument according to the invention and a computer program product according to the invention are described in more detail below, purely by way of example, in the form of specific embodiments by showing the measuring system, the transformation model, the calibrations and the measuring method with the aid of figures. In the subsequent description of the figures, reference numerals of figures already described beforehand are used in some cases. Specifically.

Figure 1:
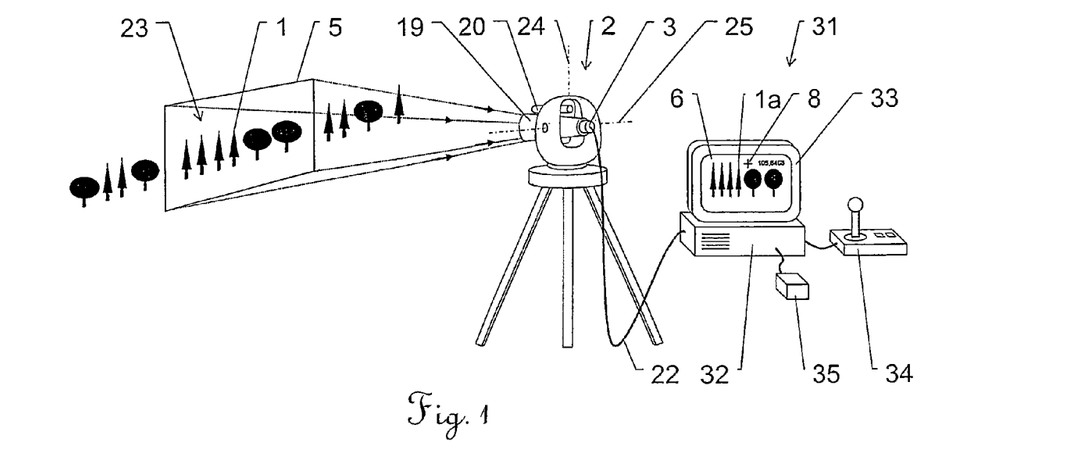
FIG. 1 shows a diagram of a geodetic measuring instrument comprising recording means and a separately arranged electronic display and control device.

FIG. 1 shows the representational diagram of a geodetic measuring instrument 2 comprising electronic recording means 3 for acquiring a recorded image of at least one object 1 to be geodetically surveyed, and comprising an electronic display and control device 31. The geodetic measuring instrument 2 has an optical unit 19 rotatable about a vertical axis 24 and pivotable about a horizontal axis 25 and comprising recording means 3, in this case in the form of a CCD or CMOS camera arranged in place of an eyepiece. The geodetic measuring instrument 2 also has an external telemeter 20 for reflectorless distance measurement and/or for focusing of the optical unit 19. Alternatively, it is possible to integrate the telemeter 20 into the optical unit 19 and/or to decouple it from the orientation of the optical unit 19 relative to its acquisition area. In the case of an integrated telemeter, the geodetic measuring instrument 2 is a so-called tacheometer. The recording means 3 acquire, within a certain acquisition strip 5 which is determined in particular by the characteristic data of the optical unit 19, a scene 23 which comprises at least one object 1 to be geodetically surveyed and which is represented in FIG. 1 by the six trees. The acquisition strip 5 can be oriented by rotating or tilting the optical unit 19, including the recording means 3, about the vertical axis 24 and the horizontal axis 25 and can optionally be varied in its size by changing the imaging scale of the optical unit 19. The orientation of the acquisition strip 5 thus arises out of the orientation of the optical unit 19 and is determined by means of angle encoders (not shown) which are integrated in the geodetic measuring instrument 2. The scene 23 within the acquisition strip 5, in particular the object 1 to be geodetically surveyed, which in this case is represented as a tree, is focused by the optical unit 19 onto the recording means 3, which have, for example, an image sensor, and produces there an image of the scene 23, acquired within the acquisition strip 5, in the form of a recorded image 4 (not shown in FIG. 1 and FIG. 2, cf. FIG. 3). The recorded image 4 is transmitted by means of a signal via a wire connection 22 to the electronic display and control device 31. Alternatively, a radio link or transmission via communication networks, such as, for example, the Internet, can be realized. This electronic display and control device 31 comprises electronic calculation means 32, electronic display means 33, input means 34 and a template memory 35. The recorded image 4 or a segment, a magnification or a reduction of the recorded image 4 is shown by the display means 33 visually in the form of a display image 6 which comprises at least the recorded object 1a to be geodetically surveyed, in this case the one tree. A coordinate on the display image 6, referred to below as display image coordinate 8, can be fixed by the input means 34, for example by positioning a cursor movable by means of a joystick or of a mouse. Furthermore, it is possible to input data, such as, for example, coordinates, zoom settings, orientation settings of the geodetic measuring instrument 2 and further data and commands, in particular for the selection of help options in the form of templates, into the calculation means 32 via the input means 34. Thus, for example, it is possible greatly to enlarge a segment of the display image 6 which contains the imaged object 1a and to input a display image coordinate by positioning a cursor exactly on an image point of the imaged object 1a. The calculation means 32 execute a program according to software and/or firmware and are formed, for example, by a CPU. The template memory 35 serves for storing at least one template, for example in the form of a graphic specification, the template at least partly modelling the object to be geodetically surveyed. The function of the template memory 35 is described in more detail further below. For the specific realization of the geodetic measuring instrument 2 described, it is possible to use a modified Leica tacheometer TCXA110x for recording the recorded image. The eyepiece is replaced by CCD camera as recorded means 3, a suitable imaging sensor being used for mass production. By installing a motor in the telescope which forms the optical unit 19, automatic focusing is permitted. The focusing can be applied both to the entire scene 23 and to defined segments. In a possible system, focusing onto certain objects can also be realized. Alternatively or in the case of simple systems, the user can also focus manually.

Figure 2:
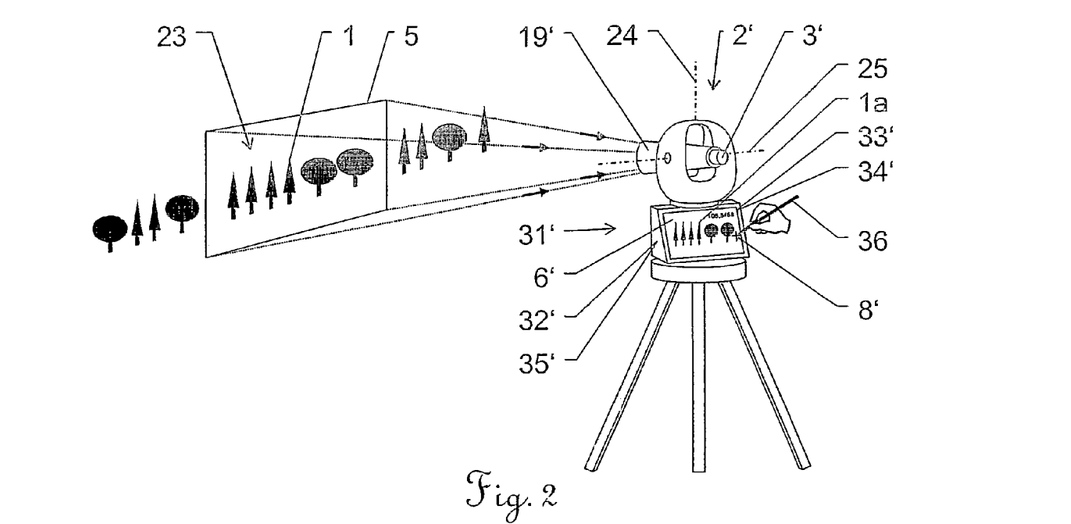
FIG. 2 shows a diagram of a geodetic measuring instrument comprising recording means and an integrated electronic display and control device.

FIG. 2 shows a possible, alternative development of the system from FIG. 1, in which a geodetic measuring instrument 2' and an electronic display and control device 31' are in the form of a common integrated unit. As in FIG. 1, the geodetic measuring instrument 2' has an optical unit 19' orientable about a vertical axis 24 and a horizontal axis 25 and comprising recording means 3' for acquiring a scene 23 with an object 1 to be geodetically surveyed within an acquisition strip 5. The display and control device 31' is on the other hand arranged directly on or inside the same housing of the geodetic measuring instrument 2' and comprises the calculation means 32', the display means 33', the input means 34' and the template memory 35' in a single device. The display means 33', which reproduces at least a part of the scene within the acquisition strip 5 in the form of at least the imaged object 1a, are in the form of a touch-sensitive TFT/LCD screen in this embodiment and thus also represent the input means 34', by means of which a display image coordinate 8' can be directly fixed in the display image 6' by touching the screen either by hand or by means of a pen 36.

Figure 3:
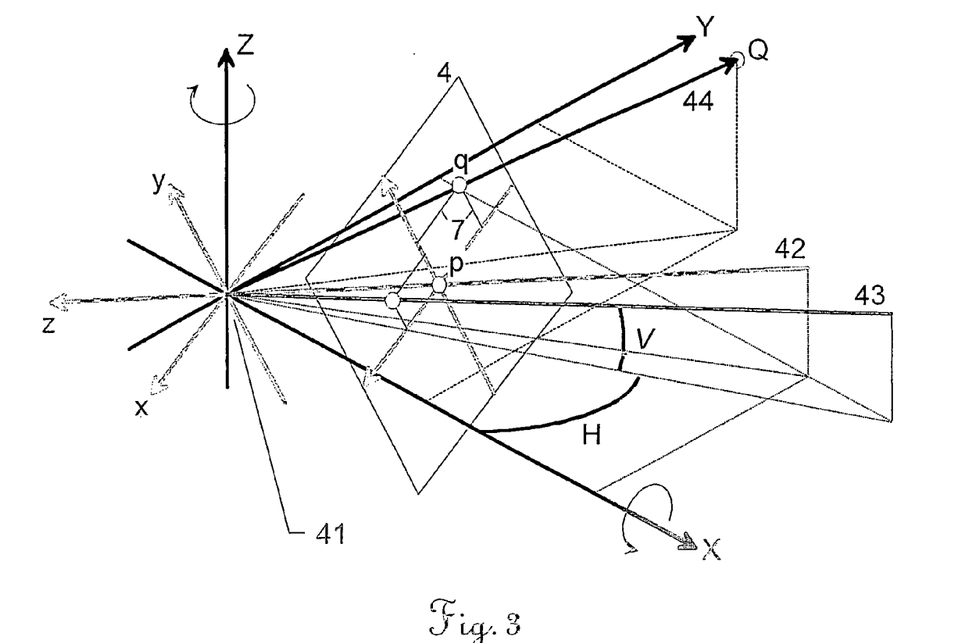
FIG. 3 shows a transformation model for transforming a recorded image coordinate into a polar angle of an acquired object.

FIG. 3 shows the transformation model for transforming a recorded image coordinate of the recorded image 4 into polar angles of an acquired object 1 having an object point Q. To enable the polar angles of an arbitrary object point Q within the acquisition strip 5 to be determined on the basis of its position on the recorded image 4, which is acquired by the image sensor of the recording means 3, and hence on the basis of its recorded image coordinate, a mathematical description of the focusing of the scene 23 onto the recorded image 4 must be known. Below, the transformation of points in the recorded image coordinate system x, y, z into the object coordinate system X, Y, Z is to be described with reference to FIG. 3. The Z axis points in the direction of the zenith and represents the vertical axis 24, and the X axis is formed by the horizontal axis 25.

For a simplified transformation with limited accuracy, it is possible to make the following assumptions, a geodetic measuring instrument which corresponds to a theodolite with respect to its systems of axes and its fundamental design being used as a starting point:

The projection center 41 of the focusing of the object acquired within the acquisition strip 5 onto the recording means 3 is at the point of intersection of vertical axis 24 and horizontal axis 25.

The horizontal axis 25 is perpendicular to the vertical axis 24.

The optical axis 42 and the theodolite axis 43 intersect at the projection center 41.

Here, the optical axis 42 is defined as the axis through the optical unit 19 and hence substantially as that axis which passes through the centers of the lenses. The theodolite axis 43 is defined as that axis relative to which the angles of rotation about the vertical axis 24 and the horizontal axis 25 are measured. This means that the point of intersection of the theodolite axis 43 with the image sensor of the recording means 3 points, in a two-position measurement, exactly to that object point Q of the object 1 which is to be surveyed. This corresponds to the sighting axis relative to the crosshairs in the case of optical theodolites.

However, it is also possible not to start from these assumptions but to extend the transformation appropriately, for example axis errors—in particular an axial offset or an axial inclination—being included in the transformation. This ensures a further increase in the accuracy of the transformation and is particularly suitable in geodetic measuring instruments of the highest precision class.

The calculations are limited to the focusing of an object point Q in a superior coordinate system, which is horizontal and whose origin is at the projection center 41, into the image plane of the recorded image 4. Conversion into an arbitrary coordinate system can be carried out by means of displacement and rotation via the known Helmert transformation with a scale equal to one.

The transformation model for transforming a recorded image coordinate into an object coordinate is as follows:

$$r_q = r_p + T_0 \cdot \left( \frac{1}{m} \cdot T_{Hz,V} \cdot R_{Inc} \cdot r_Q \right)$$

where $r_Q$ is the object vector 44 of the point Q in the system (X, Y, Z).

$r_q$ is the vector of the point q, of the image of the object point Q on the recorded image 4, measured in the recorded image coordinate system x, y, z. The x and y components are determined by the recorded image coordinate 7. The z component corresponds to the chamber constant c, which is defined as the distance of the image sensor of the recording means 3 and hence of the recorded image 4 from the projection center 41 and hence the entry pupil. The chamber constant changes with the position of a focus lens of the optical unit 19 and is therefore coupled to the scale:

Chamber constant c=imaging scale m·(distance of object from the entry pupil).

$r_p$ is the main point vector which describes the point of intersection p of the optical axis 42 with the recorded image 4.

m is the imaging scale.

$R_{Inc}$ is the rotation matrix which transforms the tilted theodolite plane into a horizontal plane.

$T_{Hz,V}$ is the transformation matrix which describes the orientation of the theodolite axis 43, based on the horizontal angle H, the vertical angle V and the corrections of the axis errors.

$T_O$ is the matrix for modelling the optical distortions.

FIG. 3 shows the above transformation of the object point $r_Q$ from the superior coordinate system X, Y, Z into the image coordinate system x, y, z. By means of the measured angle of inclination, the horizontal angle H, the vertical angle V and the axis corrections, it is possible to transform the object point vector $r_Q$ into the system of the imaging means 3. The deviation of the optical axis 42 from the theodolite axis 43 and the optical distortions are corrected by means of suitable transformations and calibrations.

Approaches from photogrammetry, such as, for example, the modelling according to Brown (1971) or Bayer (1992), known from the prior art, are suitable here. In the case of narrow-angle systems, the correction can be modelled by a simple affine transformation.

In order to avoid measurement errors, it is necessary to carry out substantially three calibrations which can be integrated into the above transformation in the form of a matrix:

temperature, focusing/imaging scale and pixel deviation in angle corrections (also includes the theodolite axis correction).

The temperature calibration is described below.

The temperature calibration of the entire system is carried out analogously to the calibration of an optical theodolite. The advantage of an image-supported system is that the object need no longer be manually sighted in both positions, but that the system determines the polar angles of the object by means of image analysis. In order to rule out effects due to optical distortions, the geodetic measuring instrument can be very accurately aligned, in the region of a few cc, with the object. The deviation between crosshairs defining the sighting axis and an object point on the image sensor of the recording means 3 is determined by means of the abovementioned model. Uncertainties in the model parameters can be neglected since the deviations are very small.

For converting the pixel deviations on the recorded image 4 into polar angles of the object 1 to be geodetically surveyed, it is necessary to know the above-defined chamber constant of the system comprising optical unit 19 and recording means 3. For this purpose, the best focus position of the optical unit 19 in each case for a target within the acquisition strip 5 is determined at different distances. Based on a mathematical model of the optical design, parameters which make it possible to derive the chamber constant from an arbitrary focus position are determined.

An online method makes it possible to determine during a measurement the imaging scale of the optical imaging, which scale is directly coupled to the chamber constant. The imaging scale can be determined on the basis of the displacement of an object point within the acquisition strip 5 on the image sensor of the recording means 3 as a result of a movement of the optical unit 19 and of the recording means 3. The method is based on a very accurate determination of the object in two or more pictures for different positions of the geodetic measuring instrument 2. The object determination is carried out by means of image matching methods.

In order to determine the polar angles of objects which lie not on the sighting axis but at an arbitrary point within the acquisition strip 5, an exact conversion of pixel deviations, defined by the recorded image coordinate 7, into angle corrections must be carried out.

The following measuring process is used. A stationary object is scanned with the geodetic measuring instrument 2. The geodetic measuring instrument 2 is positioned so that the object moves over the image sensor of the recording means 3. The recordings are carried out in both positions of the optical unit, comparable to both theodolite telescope positions. The positions of the object on the image sensor of the recording means 3 are determined by means of image analysis. A suitable method is the template matching method. The transformation parameters are determined from the horizontal and vertical angles measured by means of the geodetic measuring instrument 2 and the corresponding object positions of the image sensor of the recording means 3. In order to increase the reliability of the parameters, a plurality of objects can be used.

The axis errors (vertical index errors, collimation errors and horizontal axis errors) are also directly determined in this calibration relative to the optical axis.

The measuring method is substantially automated by image processing, so that the user has to sight each target only in the first position. In this step, the system learns the targets and then surveys them automatically in both positions.

The principle of measurement is described below.

Semiautomated surveying is based on a continuous interaction between user and instrument. This means that the user defines what is to be measured and the measuring system carries out the actual measurement without mechanical parts inevitably being moved. The measuring process has a hierarchical structure. First, the user selects a template in the form of a specification from a menu, which template describes the object to be surveyed in its form. He now has the possibility of positioning the template approximately on the imaged object or of selecting it from automatically found objects. By means of the choice of the specification, both the global and the local structure of the target can be defined. The measuring system carries out a local matching in the region of a few pixels in order thus to determine the position and the direction of an object point in the image. After a sufficient number of such local points have been determined, global matching is carried out and defines the target in its entirety. The direction angles are thus determined. In order to obtain the third dimension if required, the reflectorless telemeter 20 is used. The user can define the positioning of a laser of the telemeter 20 manually or automatically by means of the image evaluation. This is to be illustrated for an example by FIG. 4 to FIG. 8. The aim of this exemplary measurement is to determine a door frame or a corner of the door frame.

Figure 4:
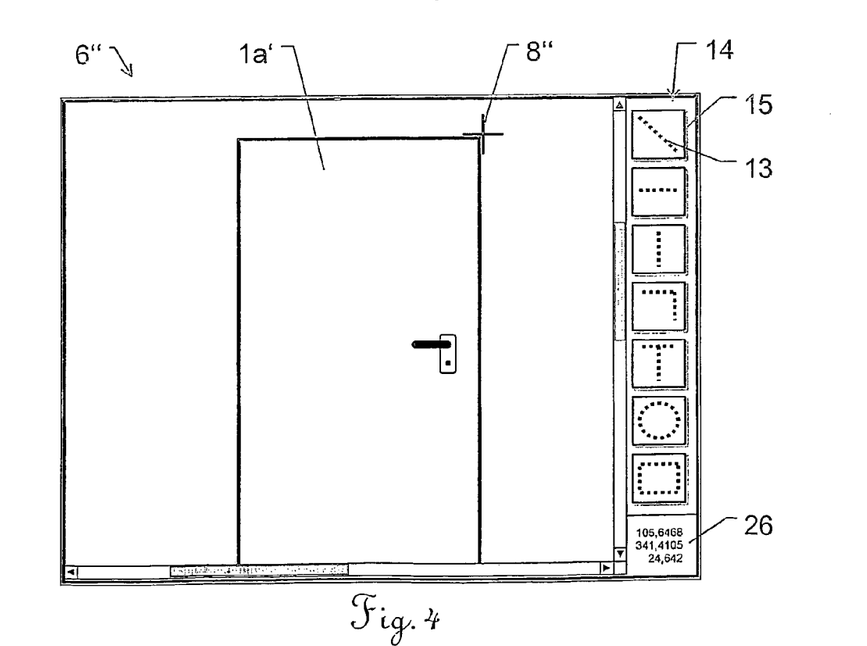
FIG. 4 shows a display image on the display means with a template selection menu and a fixed display image coordinate.

FIG. 4 shows a display image 6" displayed on the display means 33 and comprising a recorded object 1a' to be surveyed and in the form of a door. The display image 6" also shows a selection menu 14 which provides the user with a plurality of selectable menu options 15, which graphically represent template options 13 in the form of various specifications.

In a first possible variant, the user establishes, by positioning a cursor, a display image coordinate 8" in that corner of the door 1" which is to be surveyed, by moving the cursor describing the display image coordinate 8" pixel by pixel on the display means 33 by the input means 34. The calculation means 32 directly determine, from the display image coordinate 8" thus established, a recorded image coordinate 7, which results from the image segment of the display image 6" in relation to the recorded image 4, in particular from the enlarged view and the segment. On the basis of the transformation model described above, this recorded image coordinate 7 is transformed into a polar angle, in particular taking into account the angle orientation of the acquisition strip 5 of the recording means 3, the temperature and the optical error, and the result of the transformation is reproduced in the form of a display window 26 on the display image 6". In addition, a distance measurement is carried out by virtue of the fact that the telemeter 20 measures the distance to the object point using the polar angle determined. The result of this distance measurement is likewise displayed in the display window 26.

Figure 5:
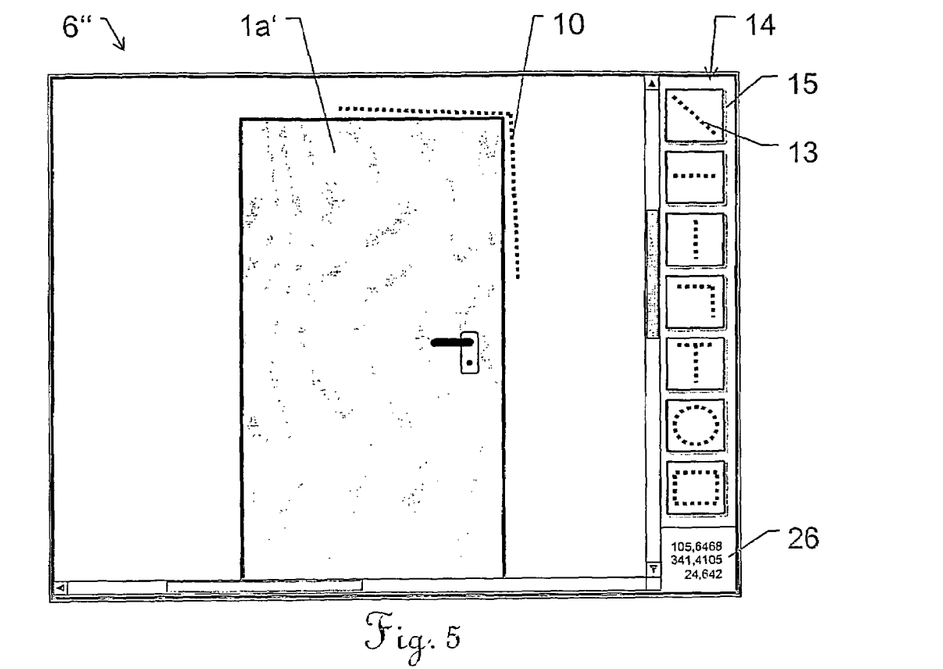
FIG. 5 shows a display image on the display means with a template selection menu and a positioned template.
Figure 6:
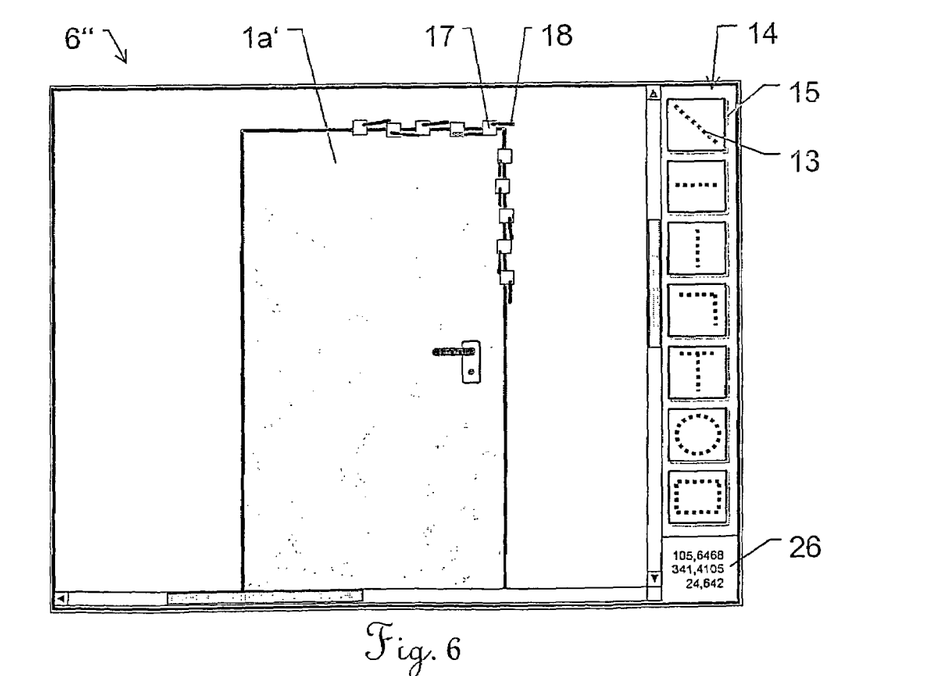
FIG. 6 shows a display image on the display means with a template selection menu and points of fit, generated by local matching, and direction vectors.
Figure 7:
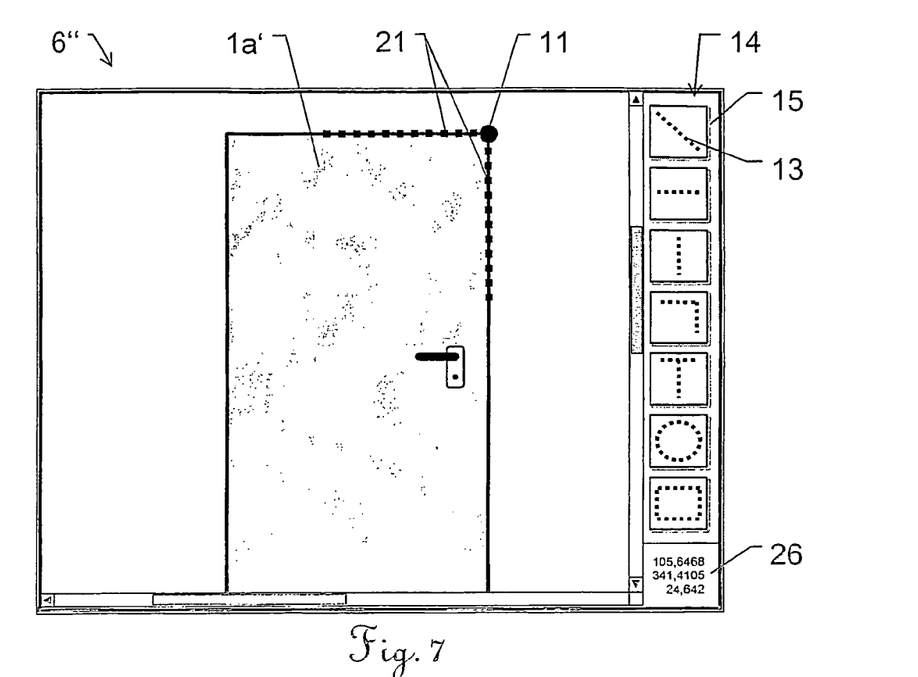
FIG. 7 shows a display image on the display means with a template selection menu and fitted lines with a characteristic point.

In a second possible variant, which is illustrated by means of FIG. 5, the determination of the object point to be surveyed is carried out with the aid of at least one template 10 which at least partly models the recorded object 1*a*' to be surveyed—in this case the upper right corner of the door. For this purpose, the user selects a suitable template option 13, in this case a polyline, from the menu options 15 of the selection menu 14. He now positions the selected template 10 by establishing a plurality of display image coordinates by the input means 34, for example with the aid of a cursor, roughly on the object 1*a*' to be surveyed, i.e. on the upper right corner of the door, as shown in FIG. 5. The template 10 is used for determining the object in the image with subpixel accuracy. For this purpose, local matching is first carried out by the calculation means 32. The matching points are characterized in FIG. 6 by points 17 of fit, and the direction of the edge by direction vectors 18. Based on the local matching points, lines 21 are now fitted, as shown in FIG. 7. The point of intersection of the lines 21 represents a characteristic point 11 of the template 10, which is now coordinated, with subpixel accuracy, with a recorded image coordinate 7 and, according to the method described above, to a polar coordinate of the object to be surveyed, in this case the upper right corner of the door, optionally including the distance.

Figure 8:
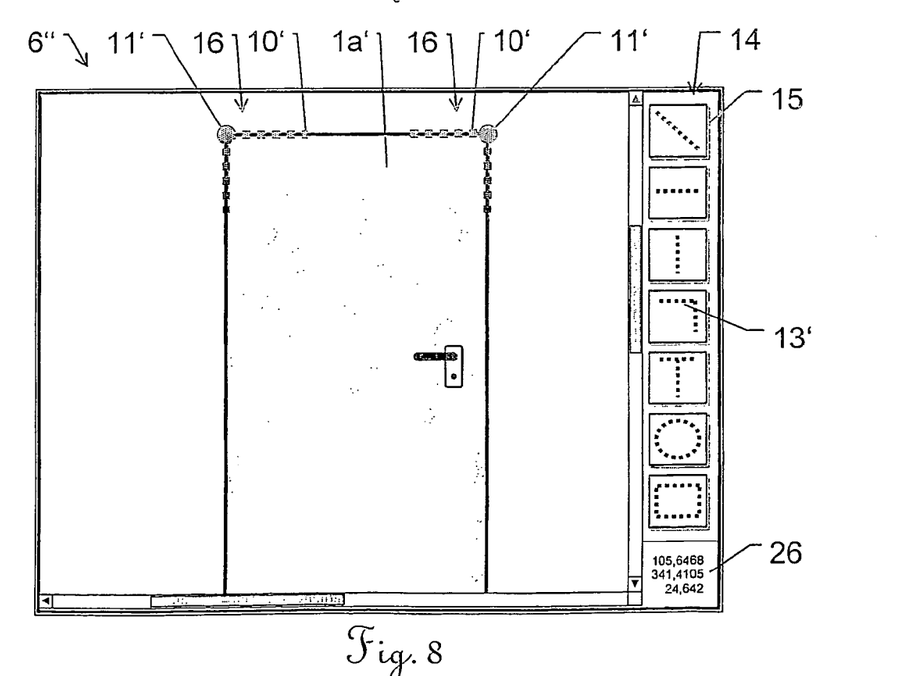
FIG. 8 shows a display image on the display means with a template selection menu and automatically exactly positioned templates with characteristic points.

In a third possible variant illustrated in FIG. 8, the user selects a template which at least partly models the object to be surveyed, by selecting a template option, whereupon the calculation means 32 searches for structures in the recorded image which resemble the template 10'. In FIG. 8, the user selects a corner template option 13' as template 10', whereupon the calculation means 32 automatically searches for corner structures in the recorded object 1*a*' by means of matching. In this case, there are two structures 16 which are similar to the corner template option 13', namely the left and the right corner of the upper door.

The template 10' is automatically positioned on these structures 16 found by the calculation means. In this case, the characteristic points 11' are in each case the corner point of the template 10'. After the selection of one of these characteristic points 11' by the user, the determination of the polar angles and optionally of the distance of the object point is effected, as described above, after determination of the corresponding recorded image coordinate 7.

Depending on the template 10, 10', it is also possible to provide, per template 10, 10', a plurality of characteristic points 11, 11', for example end points, corner points, midpoints and points of intersection.

A certain range of template options 13, 13' is available to the user, as shown above. These different template options 13, 13' are stored in a template memory 35. In particular, three possibilities for generating the template are available to the user. Firstly, it is possible to use a segment of an actually recorded image as template 10, 10'. Secondly, an artificially generated pixel image of an object can be used as template 10, 10', a displacement of the template 10, 10' in the subpixel range being determined by interpolation. The third possibility consists in the mathematical description of the object, from which the template 10, 10' can be calculated for each desired image position. The storage of a template 10, 10' generated by means of these methods in the template memory 35, which can be in the form of a known data memory, is effected either as a pixel image, it being possible to reduce this in size by suitable compression methods, or as a mathematical description, the template 10, 10' being calculated online using a suitable algorithm and not being permanently stored.

The method described can be stored as a program, in particular in the form of a computer program product, which can be read and executed as software, for example on a diskette, CD or hard disk, by the calculation means 32. It is also possible to store the program as firmware, for example on an EPROM, an electronically programmable read only memory, of the calculation means 32.

The advantages of the system and method according to the invention consist in particular in that man is integrated into the measuring process and can directly control the system, with the result that an ideal linkage of the control by the user and the reliability of algorithms is achieved. The system surveys only the relevant points which are necessary for determining the object. Compared with a scanner, which scans all points, intelligent surveying is carried out, also leading to a significant reduction of data. On the other hand, as large a number of image points as possible is used in a localized area. Redundancy in the description of the object is thus achieved. The system is also multifunctional in that both 3D points and three-dimensional objects, such as straight lines, can be surveyed by means of image evaluation. It is furthermore possible to store image data for documentation purposes. It is also possible to use the images later on in order to determine horizontal and vertical angles of further points. The 3D determination is possible if the plane in which the points lie is known.

The invention is suitable for use in a very wide range of applications. For example, the surveillance of certain objects with the system according to the invention can be substantially automated without there being any need to mount target plates or prisms in the region to be monitored. The user roughly sights the object to be monitored so that it is visible on the image. A diopter or a laser pointer can be used for this purpose. Focusing is then effected, which can be carried out manually or automatically. In a subsequent step, the object is stored as a template. By suitable matching methods, the target can then be surveyed repeatedly without the user having to intervene. As soon as a deviation above a previously specified threshold is found, an alarm is triggered. The advantage over known methods is the substantial automation without the use of artificial target plates.

The surveying of buildings is now carried out substantially manually since it is not possible to mount a prism at all points to be surveyed. With the system according to the invention, the surveying can be partly automated by interaction with the user. The user aims the geodetic measuring instrument in the wide-angle mode at the object and designates all points to be surveyed in the image. The identification can be made by the positioning of templates. For the points, it is possible to specify parameters so that, for example, some points lie in a plane or on a line. With this additional information, it is possible to accelerate the measuring process. In addition to the 3D information, possible deviations from the ideal position are then also indicated.

The same fixed points are used repeatedly for stationing a geodetic measuring instrument. By means of the system described above, it is now possible to determine these fixed points using image analysis methods. The tedious manual sighting of these points is thus dispensed with. If the fixed points are used repeatedly from the same position, the system can also store them as templates and use them again for the next stationing, which additionally accelerates the measuring process.

With the image-supported system, it is furthermore possible to realize tracking of noncooperative objects. For this purpose, the object structure is stored again and then identified iteratively in the image, and the position is determined.

The invention claimed is:

1. A method for geodetic surveying of an object, using a geodetic measuring instrument comprising electronic recording means for acquiring a recorded image of at least the object to be geodetically surveyed, the method comprising:
    determining an angle orientation of an acquisition strip of the recording means,
    acquiring the recorded image,
    visually displaying at least a part of the recorded image in the form of a display image,
    determining a recorded image coordinate by establishing at least one associated display image coordinate, and
    transforming the recorded image coordinate into at least one geodetic parameter,
    wherein the determination of the recorded image coordinate by establishing the at least one display image coordinate comprises the following partial steps of:
        calling up at least one template that is an image which at least partly models the object to be geodetically surveyed, and which is at least one of a segment of an actually recorded image and an image calculated from a mathematical description of the object,
        positioning the at least one template on the display image,
        adapting the at least one template to the recorded object, and
        determining the recorded image coordinate by means of at least one characteristic point of the at least one template,
    wherein the adaptation of the at least one template to the recorded object is effected by means of matching as an automatically exact positioning of the template on the imaged object, and comprises the following partial steps of:
        local matching of the template with the recorded object, and
        global matching using the results of the local matching.

2. The method as claimed in claim 1, wherein the determination of the recorded image coordinate by establishing the at least one display image coordinate comprises the following partial steps of:
    establishing the display image coordinate in discrete steps pixel by pixel, and
    assigning the display image coordinate to the corresponding recorded image coordinate.

3. The method as claimed in claim 1, wherein the at least one template is in the form of a segment of the recorded image or of a preceding recorded image.

4. The method as claimed in claim 1, wherein the at least one template is in the form of an artificially generated pixel image, and a displacement of the template on the display image in the subpixel range is determined by interpolation.

5. The method as claimed in claim 1, wherein the at least one template is in the form of an image calculated from a mathematical description of an object, and the template displayed on the display image is calculated by means of an algorithm.

6. The method as claimed in claim 4, wherein the at least one template is formed by a basic geometrical shape.

7. The method as claimed in claim 1, wherein the calling up of the at least one template is performed under menu control from a selection of predefined and/or predefinable template options.

8. The method as claimed in claim 7, wherein the menu-controlled calling up is effected by means of a selection menu comprising a plurality of menu options at least partly graphically representing the template options.

9. The method as claimed in claim 1, wherein the positioning of the at least one template on the display image is effected by displacing the template on the display image.

10. The method as claimed in claim 1, wherein the positioning of the template on the display image is effected at least partly automatically, comprising the partial steps of:
    searching for at least one structure resembling the template on the recorded object,
    positioning of the template on at least one structure found.

11. The method as claimed in claim 10, wherein the positioning of the template on at least one structure found is effected by selecting at least one offered structure found.

12. The method as claimed in claim 1, wherein a plurality of templates are positioned in succession on the display image and optionally connected to one another.

13. The method as claimed in claim 1, wherein the determination of the recorded image coordinate by means of at least one characteristic point of the at least one template comprises the following partial steps:
    determining at least one characteristic point of the at least one template,
    selecting a characteristic point, and
    assigning the characteristic point to a recorded image coordinate.

14. The method as claimed in claim 1, wherein the transformation of the recorded image coordinate into at least one geodetic parameter is effected at least using the recorded image coordinate and the angle orientation of the acquisition strip of the recording means.

15. The method as claimed in claim 14, wherein the at least one geodetic parameter is formed by at least one solid angle.

16. The method as claimed in claim 1, wherein the transformation comprises the partial step of:
    compensating for optical errors.

17. The method as claimed in claim 16, wherein the compensation of the optical errors is effected by means of an imaging error correction term determined individually for the geodetic measuring instrument.

18. The method as claimed in claim 1, wherein the transformation comprises the partial step of:
    compensating for temperature-dependent deviations in the assigned recorded image coordinate and/or the determined angle orientation of the acquisition strip of the recording means as a function of a measured temperature.

19. The method as claimed in claim 18, wherein the compensation of the temperature-dependent deviations is effected by means of a temperature correction term determined individually for the geodetic measuring instrument.

20. The method as claimed in claim 1, wherein the transformation is effected using the focus position and/or the imaging scale of an optical unit installed before the electronic recording means.

21. The method as claimed in claim 1, wherein the method also comprises the step of:
    providing the at least one geodetic parameter that is at least one solid angle.

22. The method as claimed in claim 21, wherein the provision of the at least one geodetic parameter is effected by visual display.

23. The method as claimed in claim 21, wherein the provision of the at least one geometric parameter is effected by outputting at least one solid angle to a telemeter, comprising the partial steps of:

measuring a distance of an object point which is defined by the at least one solid angle, and providing the distance of the object point.

24. An electronic display and control device for carrying out the method as claimed in claim 1, having electronic calculation means, electronic display means for visual display of at least a part of a recorded image in the form of a display image and optionally for visual display of at least one geodetic parameter and input means for inputting data into the calculation means, comprising a template memory for storing the at least one template.

25. An electronic display and control device, having electronic calculation means, electronic display means for visual display of at least a part of a recorded image in the form of a display image and optionally for visual display of at least one geodetic parameter, and input means for inputting data into the calculation means, comprising firmware with at least one program for carrying out the method as claimed in claim 1.

26. A geodetic measuring instrument for use in a method as claimed in claim 1, having electronic recording means for acquiring a recorded image of at least one object to be geodetically surveyed, comprising an electronic display and control device, having electronic calculation means, electronic display means for visual display of at least a part of a recorded image in the form of a display image and optionally for visual display of at least one geodetic parameter, and input means for inputting data into the calculation means, comprising a template memory for storing the at least one template.

27. A computer program product having a program code, which is stored on a machine-readable medium, for carrying out the method as claimed in claim 1, comprising the step of:

transforming the recorded image coordinate into at least one geodetic parameter.

28. A computer program product having a program code, which is stored on a machine-readable medium, for carrying out the method as claimed in claim 1, comprising the step:

adapting the at least one template to the recorded object.

* * * * *

UNITED STATES PATENT AND TRADEMARK OFFICE
CERTIFICATE OF CORRECTION

PATENT NO. : 7,633,610 B2 Page 1 of 1
APPLICATION NO. : 10/548887
DATED : December 15, 2009
INVENTOR(S) : Bernd Walser It is certified that error appears in the above-identified patent and that said Letters Patent is hereby corrected as shown below:

On the Title Page

Item (30), please change "03011908" to "03011908.5."

Please add Item (60), "Provisional application No. 60/456,371, filed on Mar. 21, 2003."

Signed and Sealed this

Sixteenth Day of March, 2010

David J. Kappos
*Director of the United States Patent and Trademark Office*